Oct. 20, 1953          H. J. BUTLER          2,656,021
AIR-COOLED BRAKE DISK
Filed July 1, 1949          2 Sheets-Sheet 1
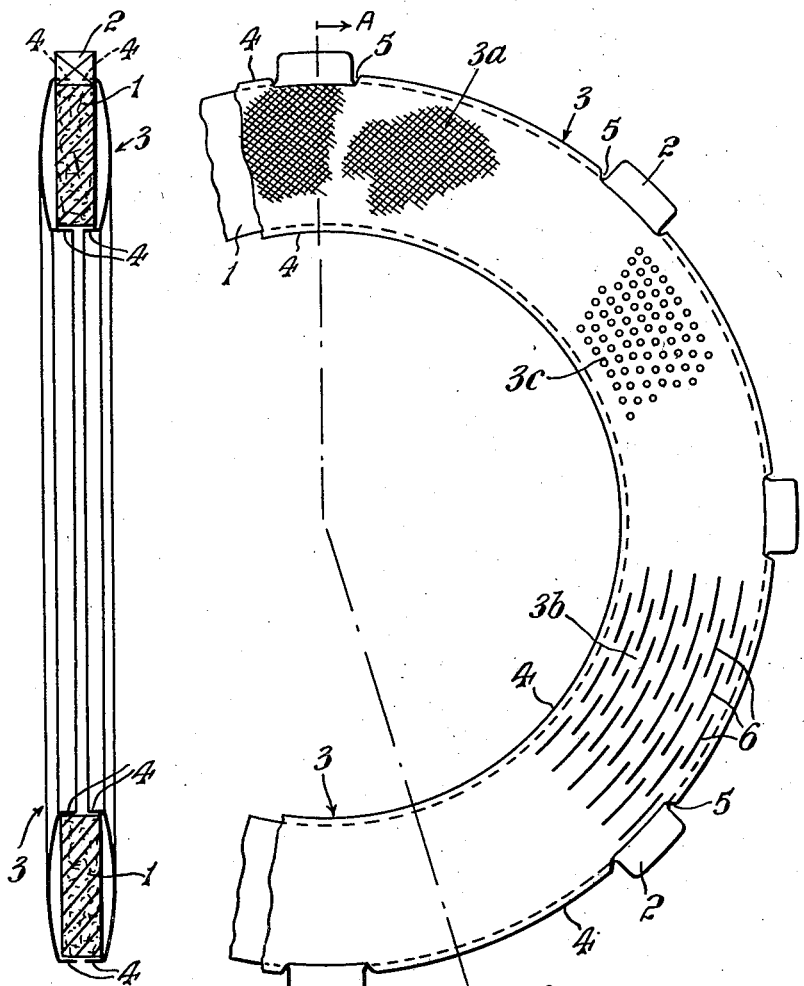
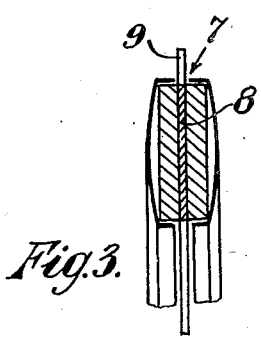

Oct. 20, 1953 H. J. BUTLER 2,656,021
AIR-COOLED BRAKE DISK
Filed July 1, 1949 2 Sheets-Sheet 2
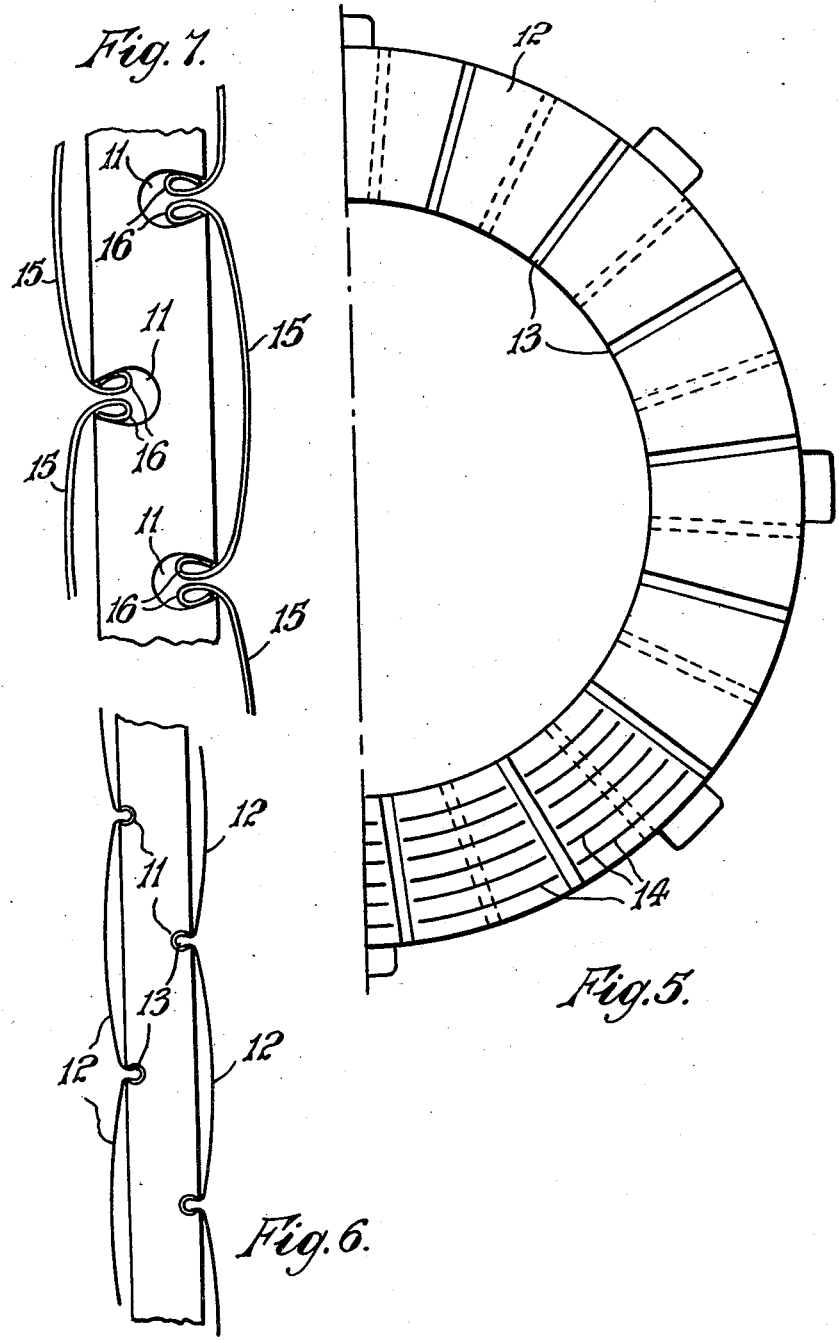
INVENTOR
Henry James Butler
by Benj. T. Rauber
attorney

UNITED STATES PATENT OFFICE 2,656,021

AIR-COOLED BRAKE DISK

Henry James Butler, Sutton Coldfield, England, assignor to Dunlop Rubber Company Limited, County of London, England, a British company Application July 1, 1949, Serial No. 102,644
In Great Britain July 3, 1948

4 Claims. (Cl. 188—251)

This invention relates to disc brakes, and more particularly to brake discs for disc brakes.

Disc brakes normally comprise one or more annular metal discs having driving lugs on their inner or outer peripheries adapted to engage in complementary slots in an associated wheel, whereby the discs are rotatable with the wheel, non-rotatable friction members disposed on each side of the disc or discs at one or more locations around their periphery and a mechanism for forcing said members into frictional engagement with the disc or discs.

When such frictional engagement takes place considerable quantities of heat are generated in the brakes. This is particularly true of aircraft disc brakes, where the great weight and high landing speed of modern aircraft and the large amounts of heat generated rapidly during braking, have presented brake designers with problems of some complexity. One method of preventing an undue rise in temperature in disc brakes is to provide brake discs of high specific heat and of considerable size and weight. The size of the discs is limited by the space available within the wheel structure, and the weight, in particular, is highly objectionable in aircraft, where it is most desirable that the weight be kept as low as possible. Another objection lies in the fact that if excessive heat is transmitted to the discs they tend to distort, thus rendering the brakes inefficient or even inoperative.

It is the object of this invention to provide a brake disc for disc brakes which is light in weight and which is not so liable to distort as a disc of the conventional type.

According to the invention a brake disc has a loose metal facing adapted to rotate therewith.

The facing may be made of metal gauze, i. e. an interlaced wire fabric, or of perforated metal or it may be a plain sheet metal member. The disc itself may e. g. be made of steel, and when assembled the loose facing passes between the face of the disc and the braking element or elements associated with the wheel, the relative coefficients of friction of the disc, elements and facing being such that the facing rotates with the disc during braking. Thus frictional contact is effected between the facing and the braking element and not between the surface of the disc and the braking element, as hitherto. Preferably the facings are adapted to stand away from the disc when not in contact with the braking element, and the disc is made of non-conductive material or material of poor thermal conductivity. Thus, on braking, the heat generated will be largely retained in the facings, and will readily be dissipated by air blowing across and through said facings.

The invention will now be described with reference to the accompanying drawings, in which:

Figure 1 represents a portion of a brake disc made in accordance with the invention and showing three types of metal facing.

Figure 2 is a section through line A—A of Figure 1 looking in the direction of the arrows.

Figure 3 is a section of an alternative type of disc.

Figure 4 is an enlarged part section of one type of facing.

Figure 5 is a portion of a brake disc made in accordance with another embodiment of the invention.

Figure 6 is a portion of a side view thereof.

Figure 7 is an enlarged side view of an alternative type of disc and facing.

In one embodiment of the invention (Figures 1 and 2) a brake disc comprises an annular steel disc 1 having a plurality of equispaced driving lugs 2 extending outwardly from the outer periphery thereof. Two loose metal facings 3 are provided, one to each face of the disc. The edges 4 of the facings are turned over the edges of the disc, and rectangular cut-outs 5 are provided in the outer peripheral turned-over portion to accommodate the driving lugs. The facings are made of thin wire metal gauze 3a of high thermal conductivity, e. g. copper, beryllium-copper or nickel-chrome, and are highly planished. The facings are springy and have a slightly convex cross-section so that they tend to stand away from the surface of the disc.

The relative coefficients of friction of the disc, friction elements and facings is such that during braking the facings rotate with the disc, the turned-over portions of the facings maintaining the facing in register with the disc. Since the facings stand out from the surface of the disc except where pressed against the disc by the braking elements, air can pass through and behind said facings and thus speedily dissipate the heat generated by frictional contact with the elements.

In another and similar construction the facings are made of thin sheet metal and are provided, as shown at 3b (Figure 1) with circumferentially extending slits 6 to promote cooling of the facing.

In another embodiment of the invention the disc 7 (Figure 3) is made of bonded fabric or plastic and has a thin steel strengthening member 8 central thereof and provided with driving lugs 9 as in the previous embodiment. The facings 3c are made of perforated metal (Figure 1), the perforations being provided with burrs 10 (Figure 4) which stand out on one side of the facing. The burrs engage in the face of the disc and transmit the drive from the disc to the facing, the braking element then engaging with the smooth side of the facing.

As in the previous embodiment the edges of the facings are turned over the edges of the disc and the facings stand out from the surface of the disc.

In a further embodiment of the invention (Figures 5, 6 and 7) the discs are provided with a plurality of radially extending slots 11, the bottom of the slot being slightly wider than the top. The slots on one side of the disc are staggered with respect to those on the other side. The facings 12 (Figures 5 and 6) are annular sheet metal members of slightly springy material and are provided with radially-extending folds 13 which are spring-fitted into the grooves. Between the grooves the facings are adapted to stand away from the surface of the disc so that air may pass between the disc and the facing and so promote cooling. To enhance this cooling effect the facings may be provided, between the grooves, with circumferentially-extending slits 14. (Figure 5).

The disc may be a thin steel annulus, but is preferably made of a light and non-conductive material, such as bonded fabric or plastic, which may be provided with an annular steel re-inforcing member. Alternatively, a light alloy disc, such as Duralumin or a magnesium alloy may be used.

In an alternative construction (Figure 7) the facing comprises a plurality of arcuate-shaped plates 15, the radially-extending sides of which are turned over substantially at right angles to their face, and are further provided with beaded edges 16. The material is springy, and the plates are sprung into the grooves in the disc, the facing standing away from the face of the disc. As in the previous embodiment, the facings may be slit to promote cooling. In these last two embodiments of the invention the grooves may be provided at an angle to the radius.

Instead of the facings being driven by friction they may be driven by cut-outs in the facings engaging with corresponding projections on the inner or outer periphery of the disc. In such cases the facing must be sufficiently robust to permit this without distorting.

Having described my invention what I claim is:

1. A metallic brake element which comprises a brake disk having slots extending substantially radially and a metallic facing plate spanning the spaces between successive slots and spaced from said disk to form an air space between said slots and extending into said successive slots to secure said plate from rotation relatively thereto.

2. The brake element of claim 1 in which the facing plate comprises a plurality of arcuate shaped plate segments having edges spring fitted into said slots.

3. A metal brake element comprising a disc for rotation with a wheel, and provided with spaced, substantially radial slots in one face, and metal, friction, facing plates each having a projection spaced equally with the radial slots of said disc and engaged one in one slot and another in an adjacent slot and spanning and spaced from the disc between said slots to form an air space between said slots.

4. A metal brake element comprising a brake disc having means projecting from one periphery for engagement with a wheel and provided with slots extending substantially radially across the disc and metal friction facing plates extending from one slot to another and spaced from said disc to form air spaces between said slots each plate having two of its edges extending into adjacent slots in detachable engagement therewith.

HENRY JAMES BUTLER.

References Cited in the file of this patent

UNITED STATES PATENTS

| Number | Name | Date |
|---|---|---|
| 174,183 | Bayley | Feb. 29, 1876 |
| 923,613 | Atwood | June 1, 1909 |
| 941,201 | Keller | Nov. 23, 1909 |
| 1,132,958 | Miller | Mar. 23, 1915 |
| 1,272,690 | Madsen | July 16, 1918 |
| 1,493,433 | Guay et al. | May 6, 1924 |
| 1,810,361 | Loeffler | June 16, 1931 |
| 2,163,884 | La Brie | June 27, 1939 |
| 2,172,503 | Fies | Sept. 12, 1939 |

FOREIGN PATENTS

| Number | Country | Date |
|---|---|---|
| 30,790 | Great Britain | Dec. 30, 1897 |
| 4,978 | Great Britain | Mar. 9, 1905 |
| 7,848 | Great Britain | Apr. 2, 1906 |
| 499,882 | Great Britain | Jan. 31, 1939 |